(12) United States Patent
Arquie et al.

(10) Patent No.: US 6,836,275 B1
(45) Date of Patent: Dec. 28, 2004

(54) METHOD FOR DISTINGUISHING BETWEEN SINGLE AND MULTIPLE CONNECTIONS IN A NETWORK TOPOLOGY

(75) Inventors: Louis Arquie, Cupertino, CA (US); Kenneth M. Turner, Boulder Creek, CA (US)

(73) Assignee: SANavigator, Inc., Broomfield, CO (US)

( * ) Notice: Subject to any disclaimer, the term of this patent is extended or adjusted under 35 U.S.C. 154(b) by 617 days.

(21) Appl. No.: 09/823,682

(22) Filed: Mar. 30, 2001

Related U.S. Application Data

(60) Provisional application No. 60/228,516, filed on Aug. 28, 2000.

(51) Int. Cl.[7] .............................. G06F 3/00; G06F 3/14
(52) U.S. Cl. ....................... 345/734; 345/835; 345/839; 345/853; 345/859; 345/969; 709/223
(58) Field of Search ................................. 345/734, 764, 345/808–810, 835, 839, 853, 856, 859, 862, 969, 970; 709/223, 224; 719/315, 316

(56) References Cited

U.S. PATENT DOCUMENTS

| | | | |
|---|---|---|---|
| 5,276,789 A | | 1/1994 | Besaw et al. |
| 5,278,951 A | | 1/1994 | Camacho et al. |
| 5,408,603 A | * | 4/1995 | Van de Lavoir et al. ... 345/763 |
| 5,590,119 A | * | 12/1996 | Moran et al. ................ 370/225 |
| 5,751,965 A | * | 5/1998 | Mayo et al. ................. 709/224 |
| 5,910,803 A | | 6/1999 | Grau et al. |
| 5,995,101 A | * | 11/1999 | Clark et al. ................. 345/711 |
| 6,014,715 A | | 1/2000 | Stoevhase |
| 6,067,093 A | | 5/2000 | Grau et al. |
| 6,072,490 A | * | 6/2000 | Bates et al. .................. 345/821 |
| 6,078,324 A | | 6/2000 | Phathayakorn et al. |
| 6,078,739 A | * | 6/2000 | Paterson et al. ............... 703/6 |
| 6,229,538 B1 | * | 5/2001 | McIntyre et al. ........... 345/734 |
| 6,369,819 B1 | | 4/2002 | Pitkow et al. |
| 6,470,383 B1 | * | 10/2002 | Leshem et al. ............. 709/223 |

OTHER PUBLICATIONS

Cisco Systems Inc., "Monitoring a LightStream 2020 Switch", 1989–1997, pp. 4–1/4–51.*

* cited by examiner

*Primary Examiner*—X. L. Bautista
(74) *Attorney, Agent, or Firm*—Hensley Kim & Edgington, LLC

(57) ABSTRACT

A computer user interface to display connections in a network topology display. Different visual representations are used for a single and multiple connection types. If there is only a single connection between nodes then a simple line is used. If there are multiple connections between nodes then a line that terminates in a "fork," or small U-shape symbol, is used to indicate a multiple connection line. The termination symbol, or "connection endpoint symbol," is adjacent to a node at each end of the line. In general, many types of symbols can be used. For example, a square, diamond, or other basic shape can be used as the connection endpoint symbol. Also, the invention provides for a symbol to be adjacent to, or in the vicinity of, a node. For example, the number of connections represented by a line can be shown near the node, or connection, to which the number relates. A feature of the invention provides for details of the multiple connection line to be displayed upon user selection. If a user moves a pointer in the vicinity of a multiple connection line then a text box appears that describes the actual number of connections represented by the multiple connection line. Other information can be provided by the text box.

12 Claims, 5 Drawing Sheets

METHOD FOR DISTINGUISHING BETWEEN SINGLE AND MULTIPLE CONNECTIONS IN A NETWORK TOPOLOGY

CLAIM OF PRIORITY

This application claims priority from Provisional Patent Application Ser. No. 60/228,516 filed Aug. 28, 2000 which is hereby incorporated by reference as if set forth in full in this document.

CROSS-REFERENCE TO RELATED APPLICATIONS

This application is related to the following copending patent application which is each hereby incorporated by reference as if set forth in full in this document for all purposes:

(1) Method for Displaying Nodes of a Network using a Multilayer Representation wherein Nodes can be Selectively Collapsed or Expanded, filed on Mar. 21, 2000 Ser. No. 09/539,350.

BACKGROUND OF THE INVENTION

This invention relates in general to computer user interfaces and more specifically to a method for displaying multiple connections between nodes in a network topology display in a computer user interface.

Computer graphics has become an important application for computer systems. The ability to clearly and effectively display information in a graphical form has spawned many useful computer programs such as for computer-assisted drawing (CAD), electronic and microelectronic circuit layout, network topology display and network management, etc.

Although many applications exist which effectively use computer graphics to provide an efficient user interface, problems arise due to the ever-increasing complexity and density of the information to be displayed. For example, today's networks have many components, or nodes, including servers, disk arrays, routers, hubs, switches, clients, etc. Each node may have several, or many, connections to other nodes. While it is useful to provide a comprehensive graphical image about the network, including all of the nodes and connections, such a task is made difficult because of a limited display area, limited resolution, desire to show a large part of the network in a small area, etc.

The task of providing an accurate, comprehensive picture of an interconnected system, such as a network, becomes even more difficult where the user needs to know the exact count of connections between two nodes and when the user must know whether lines are electrically coupled to each other or are merely crossing each other because of display limitations.

Prior art approaches include allowing a user to "zoom" in, or out, from a picture to show more or less detail. This allows a user to zoom out to make the picture small for purposes of obtaining an overall (but imprecise) view of an interconnected system. The user can then zoom in to see details of a smaller part of the system—such as to determine the exact number of lines (i.e., connections) between two components or nodes.

However, the ability to zoom in and out requires the user to issue one or more commands. Thus, the zooming approach places a burden on the user. The requirement to issue commands by, for example, moving a mouse pointer and clicking on a menu or icon; using a hotkey on a keyboard, etc., can make obtaining desired information from a network picture very unpleasant and time-consuming.

Thus, it is desirable to provide a system and method that improves upon one or more of the shortcomings of the prior art.

SUMMARY OF THE INVENTION

The present invention uses different visual representations for a single connection and multiple connections. If there is only a single connection between nodes then a simple line is used. If there are multiple connections between nodes then a line that terminates in a "fork," or small U-shape symbol, is used to indicate a multiple connection line. The termination symbol, or "connection endpoint symbol," is adjacent to a node at each end of the line. In general, many types of symbols can be used. For example, a square, diamond, or other basic shape can be used as the connection endpoint symbol. Also, the invention provides for a symbol to be adjacent to, or in the vicinity of, a node. For example, the number of connections represented by a line can be shown near the node, or connection, to which the number relates.

A feature of the invention provides for details of the multiple connection line to be displayed upon user selection. If a user moves a pointer in the vicinity of a multiple connection line then a text box appears that describes the actual number of connections represented by the multiple connection line. Other information can be provided by the text box.

In one embodiment the invention provides a method including steps of obtaining connection information about a first node interconnected with a second node; displaying the first node on a display screen; displaying the second node on the display screen; if there is a single connection between the nodes then performing the step of displaying a first connection endpoint symbol on the display screen adjacent to both the first and second nodes; and if there are multiple connections between the nodes then performing the step of displaying a second connection endpoint symbol on the display screen adjacent to both the first and second nodes.

DESCRIPTION OF THE SPECIFIC EMBODIMENTS

A preferred embodiment of the invention is incorporated into a software product called "SANavigator" produced and distributed by Connex, Inc.

Figure 1A:
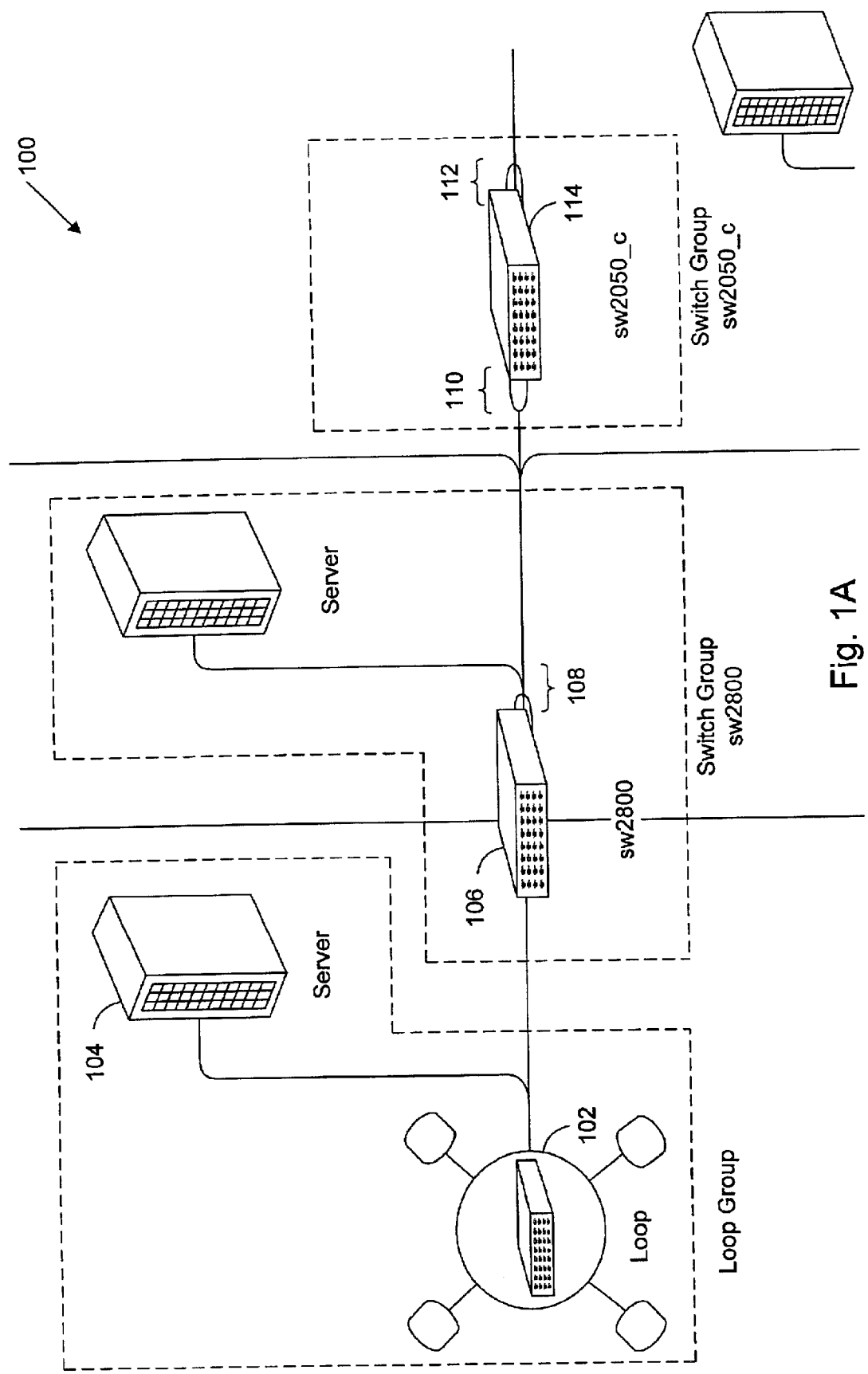
FIG. 1A illustrates a portion of a screen display of the present invention.

FIG. 1A illustrates a portion of a screen display of the SANavigator interface of the present invention.

In FIG. 1A, screen display 100 includes interconnected nodes. Nodes include any type of network device such as hub 102, server 104, switch 106 and switch 114. Other types of nodes are possible such as client computers, routers, etc. Typically, a node can be any type of hardware device or functionality that is of interest in analyzing, creating or managing a communications network.

As shown in FIG. 1A, nodes are connected by lines. Lines have "end segments" which are merely portions of a line at the ends of the line. The line end segments are adjacent to, or in contact with, the nodes which they connect together. As shown for the lines between nodes 102, 104 and 106, for example, the line end segments are each contacting the nodes. In another embodiment, the line ends need not contact the nodes but can be substantially close to the nodes so that it is clear to which nodes the connections apply.

FIG. 1A shows a second type of connection endpoint symbol at 108. This symbol has a "U" shape or "fork" shape. In a preferred embodiment, the second type of connection symbol is used to indicate multiple connections between nodes. The multiple connections can be separate physical connections, separate logical or virtual channels over one or more physical connections, redundant connections or other types of couplings for receiving electronic, electromagnetic, optical or other manner of conveying information.

Multiple connection endpoint symbols are also used at 110 and 112. Note that even where multiple connections are present, a single line is used to connect the two multiple connection endpoint symbols. This approach saves space and makes the display less cluttered for better viewing and thereby assists a user in understanding the network topology display. Other embodiments may connect the endpoint symbols with other than a single line. Even though a single line is used to connect both the first type (single) of connection endpoint symbol and the second type (multiple) of connection endpoint symbol, the different connection endpoint types allow a user to easily detect whether the connection line represents single or multiple connections.

Additional endpoint symbols can be used to indicate different types, or combinations, of connections. In FIG. 1A, the connection endpoint symbol at 110 indicates a multiple connection. Note that the symbol at 110 is a two-pronged symbol. The connection endpoint symbol at 112 is a three-pronged symbol and indicates that both a multiple connection and a single connection are connected to the node. Other variations, or forms, of endpoint symbols can be used to convey other connection information.

Figure 1B:
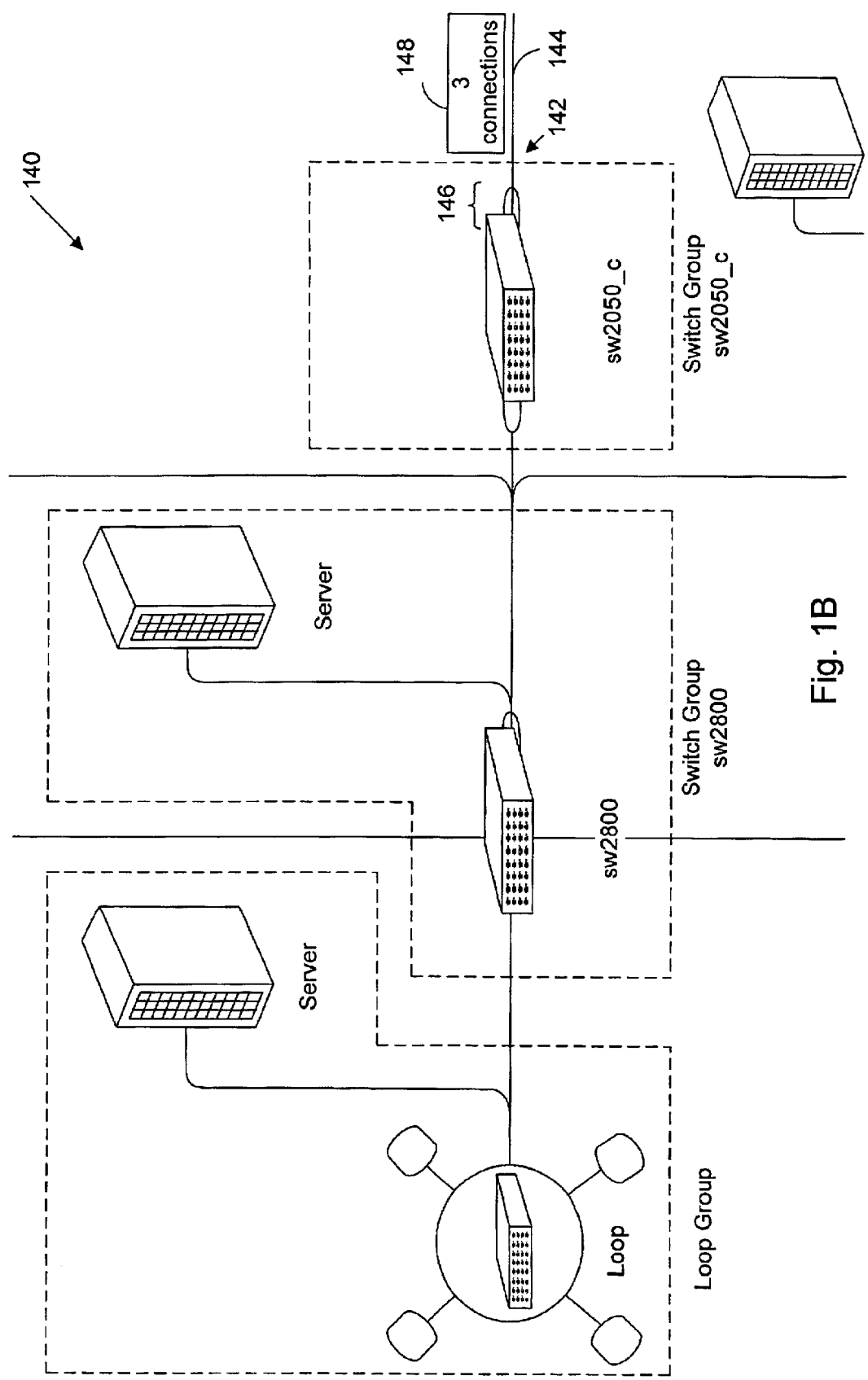
FIG. 1B illustrates a portion of a second screen display of the present invention.

FIG. 1B illustrates revealed information about a multiple connection in the preferred invention.

In FIG. 1B, screen display 140 shows pointer 142 in the proximity of connection line 144. Since connection line 144 is part of a multiple connection as indicated by multiple connection endpoint symbol 146, pop-up text in information box 148 is displayed to provide more information about the multiple connection. In this case, the additional information states "3 connections" to indicate to the user that the multiple connection is actually 3 connections. Other embodiments can include other information about the connection such as the bandwidth of each connection, type of connection, whether the connection is presently active, etc.

Also note that connection line 144 along with multiple connection endpoint symbol 146 have been emboldened, or thickened, to show that the displayed information corresponds to the emboldened connection. If pointer 142 is moved (e.g., via a mouse, trackball, etc.) near another connection on the display, that other connection would be emboldened while connection 144 and multiple connection endpoint symbol 146 would return to a normal type of display (i.e., not emboldened). A text box would appear near the other connection to show information about the other connection.

Other ways of selecting connections to obtain additional information are possible. For example, a predefined key, or keys, on a keyboard can be depressed to provide information about connections. One keypress can correspond to a specific connection, or more than one connections. For example, one or more keypresses can cause all connection information about multiple connections to be displayed so that multiple information boxes similar to information box 148 are displayed.

Figure 2A:
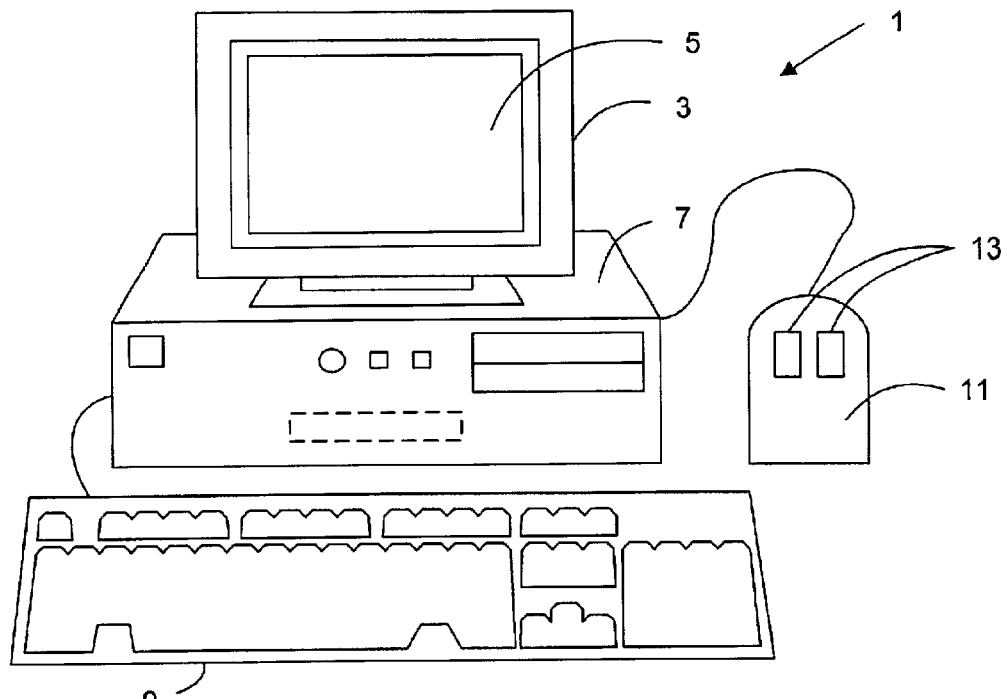
FIG. 2A illustrates a computer system suitable for use with the present invention.
Figure 2B:
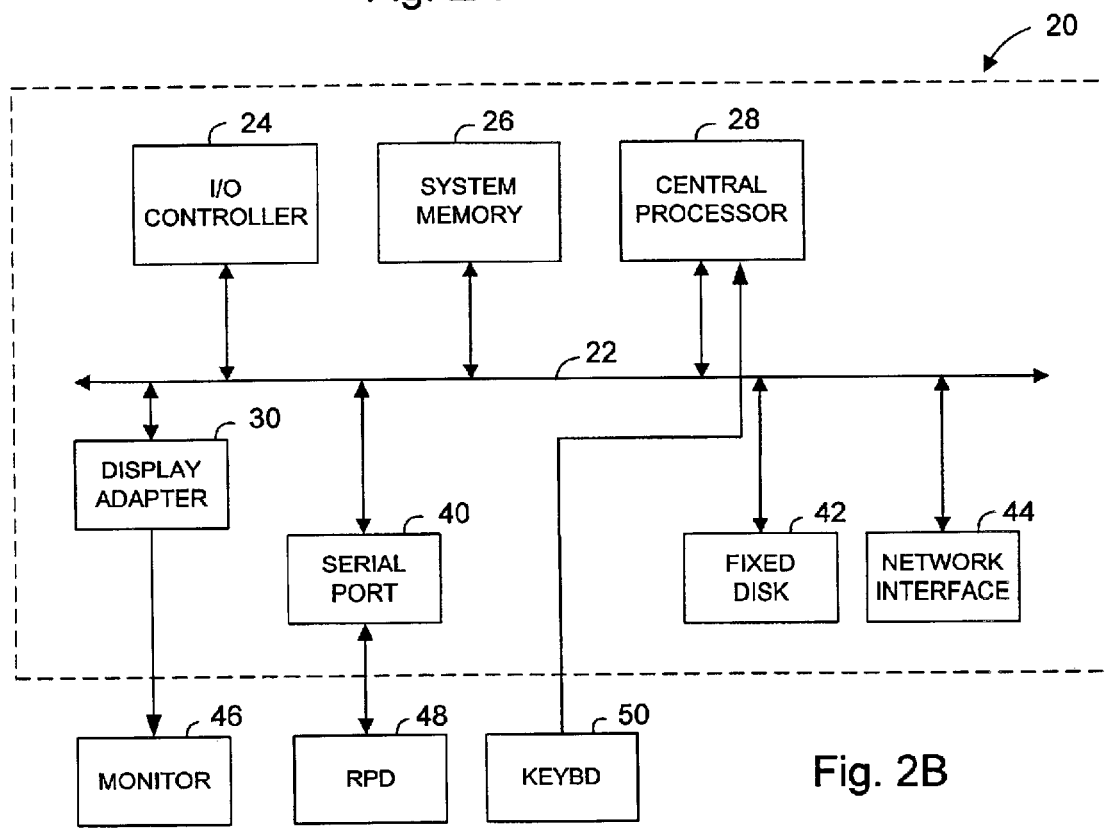
FIG. 2B shows basic subsystems in the computer system of FIG. 2A.

FIGS. 2A and 2B illustrate hardware suitable for use with the present invention.

FIG. 2A is an illustration of computer system 1 including display 3 having display screen 5. Cabinet 7 houses standard computer components (not shown) such as a disk drive, CDROM drive, display adapter, network card, random access memory (RAM), central processing unit (CPU), and other components, subsystems and devices. User input devices such as mouse 11 having buttons 13, and keyboard 9 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different, hardware components and can be made in many dimensions and styles (e.g., laptop, palmtop, pentop, server, workstation, mainframe). Any hardware platform suitable for performing the processing described herein is suitable for use with the present invention.

FIG. 2B illustrates subsystems that might typically be found in a computer such as computer 1.

In FIG. 2B, subsystems within box 20 are directly interfaced to internal bus 22. Such subsystems typically are contained within the computer system such as within cabinet 7 of FIG. 2A. Subsystems include input/output (I/O) controller 24, System Memory (or random access memory "RAM") 26, central processing unit CPU 28, Display Adapter 30, Serial Port 40, Fixed Disk 42, Network Interface Adapter 44. The use of bus 22 allows each of the subsystems to transfer data among subsystems and, most importantly, with the CPU. External devices can communicate with the CPU or other subsystems via bus 22 by interfacing with a subsystem on the bus. Thus, Monitor 46 connects with Display Adapter 30, a relative pointing device (e.g. a mouse) connects through Serial Port 40. Some devices such as Keyboard 50 can communicate with the CPU by direct means without using the main data bus as, for example, via an interrupt controller and associated registers.

As with the external physical configuration shown in FIG. 2A, many subsystem configurations are possible. FIG. 2B is illustrative of but one suitable configuration. Subsystems, components or devices other than those shown in FIG. 2B can be added. A suitable computer system can be achieved without using all of the subsystems shown in FIG. 2B. For example, a standalone computer need not be coupled to a network so Network Interface 44 would not be required. Other subsystems such as a CDROM drive, graphics accelerator, etc. can be included in the configuration without affecting the performance of the system of the present invention.

Figure 3A:
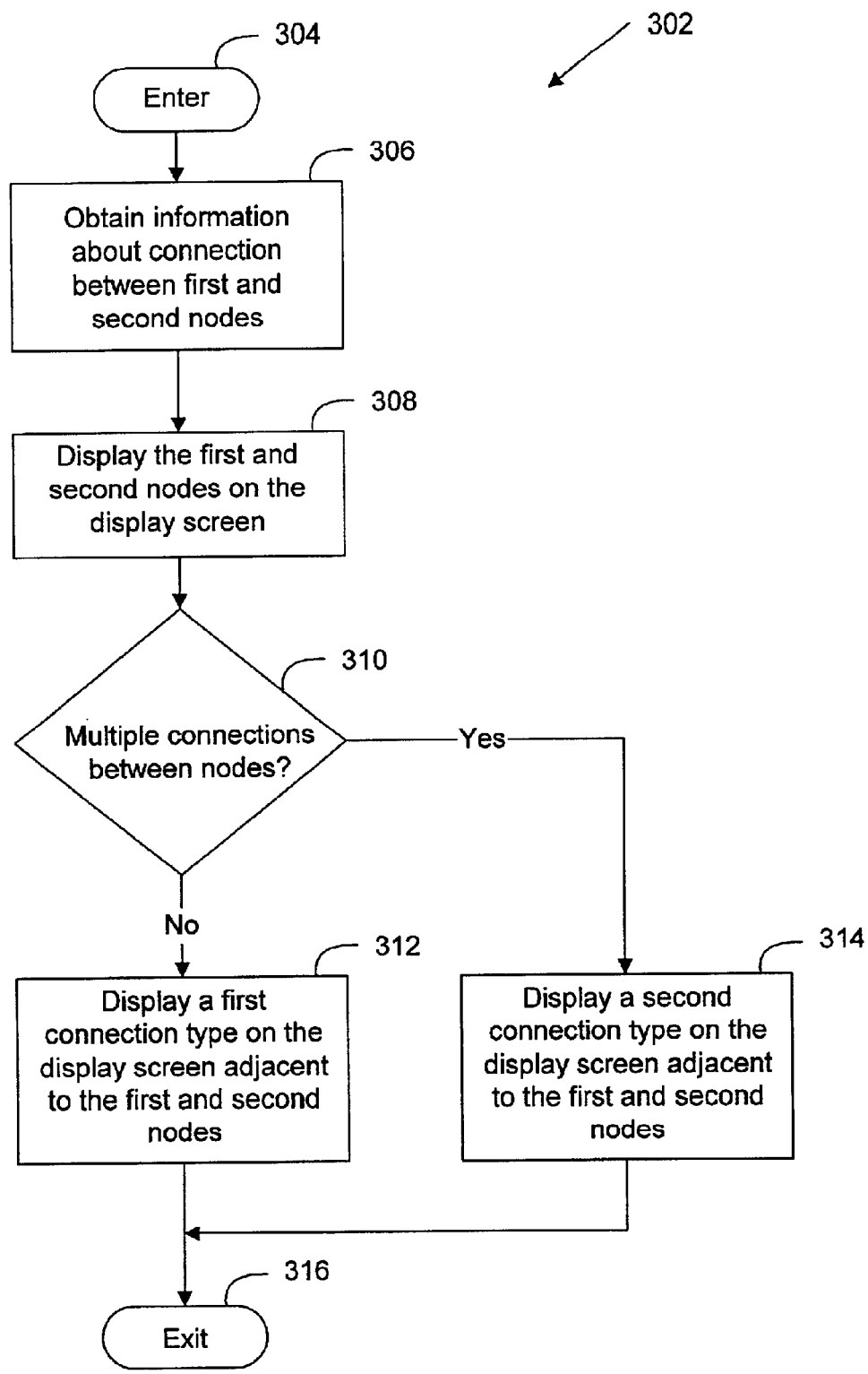
FIG. 3A shows a flowchart for a routine to display a connection.
Figure 3B:
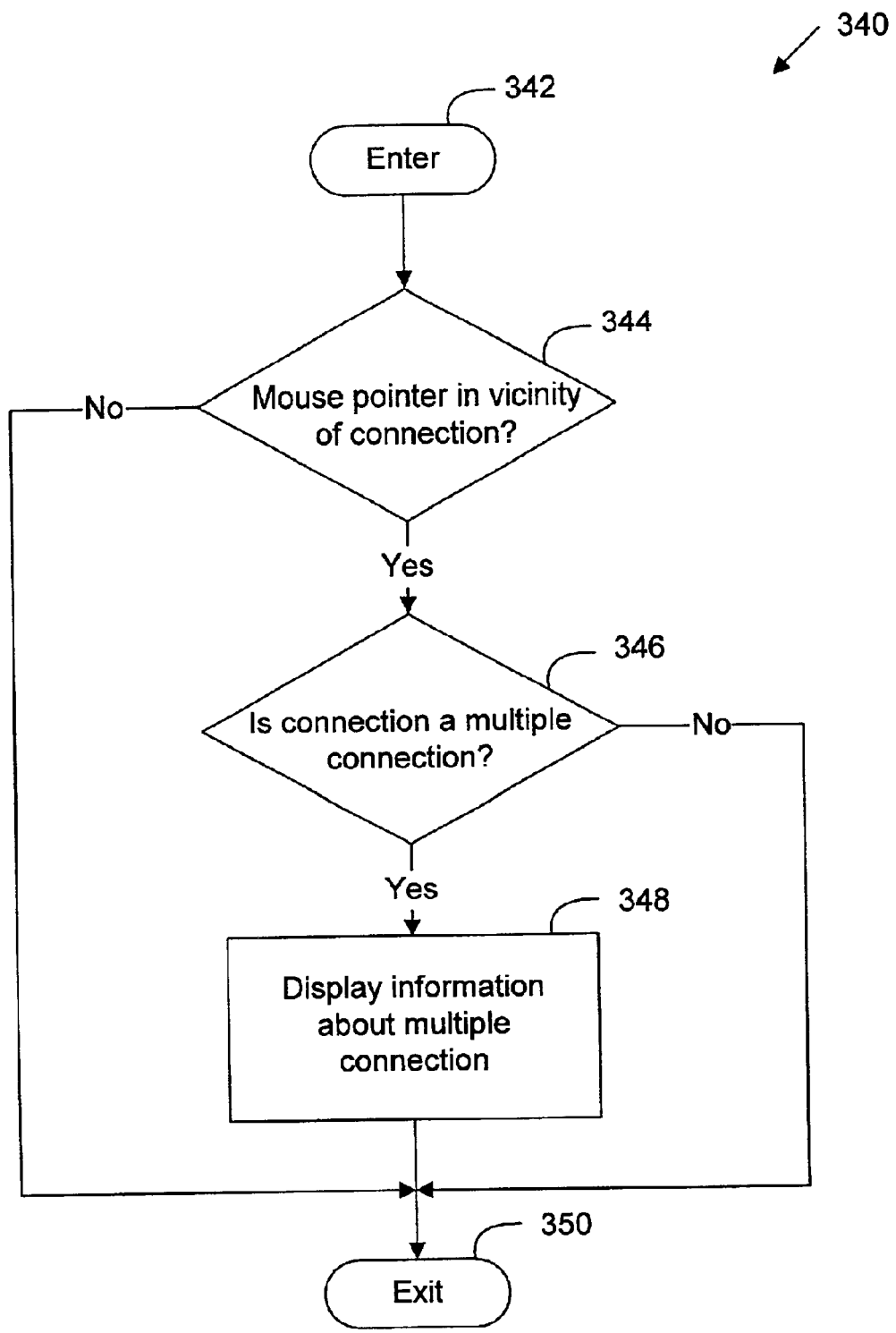
FIG. 3B shows a flowchart for a routine to display connection information.

FIGS. 3A and 3B show flowcharts describing basic steps of the present invention.

FIG. 3A shows steps in a routine to display a connection between two nodes.

In FIG. 3A, flowchart 302 is entered at 304 when it is desired to display a connection between two nodes. It is assumed that the two nodes are identified such as by passing parameters to a subroutine incorporating the steps of FIG. 3A. At step 306, information about the connection between the nodes is obtained. Such information can be maintained in a database, data structure or other mechanism in hardware or software. The information can reside in RAM, ROM, hard-disk storage, be received from a network or external source, etc.

At step 308, the first and second nodes are displayed on the display screen. At step 310 a check is made as to whether multiple connections are to be indicated between the two nodes. If not, execution proceeds to step 312 where a first type of connection is displayed adjacent to the first and second nodes to indicate that there is no multiple connection. If so, execution proceeds to step 314 where a second type of connection is displayed adjacent to the first and second nodes to indicate that there is a multiple connection. As described above, multiple connections are indicated with a connection endpoint symbol designed to convey to the user that the connection is a multiple connection. Other ways of indicating a multiple connection are possible such as by using text or symbols near one or both of the nodes.

After either of steps 312 or 314, the routine corresponding to the flowchart of FIG. 3A exits at 316.

FIG. 3B illustrates a routine to display connection information when a pointer is moved in the vicinity of a multiple connection. The operation of moving a pointer near, or onto, an item on the screen is also referred to as a "mouseover" event.

In FIG. 3B, the routine of flowchart 340 is entered at 342. At step 344 a check is made as to whether the pointer is in the vicinity of a connection. If not, the routine exits at 350. If the pointer is near a connection then step 346 is executed to determine whether the connection is a multiple connection. If the connection is not a multiple connection then execution terminates at 350. If the connection is a multiple connection then step 348 is executed to display information about the multiple connection. Such display of information about the multiple connection can be by a pop-up text box, as described above, or by other means. For example, the text box can appear at any location on the display screen such as on a status bar or other area specifically designed to display connection information. The information can even appear on a different display screen, or via a different output device. The information can by presented visually such as by using a symbol, animation, color, etc. The information can be presented audibly such as with a tone, digital audio or speech synthesis. Any form of presentation of the information is possible.

Note that the flowchart descriptions of the routines are only designed to be a general indication of the basic steps of the routines. Any suitable programming language can be used to implement the routines of the present invention including C, C++, Java, assembly language, etc. Different programming techniques can be employed such as procedural or object oriented. The routines can execute on a single processing device or multiple processors. Although the flowchart format demands that the steps be presented in a specific order, this order may be changed. Multiple steps can be performed at the same time. The flowchart sequence can be interrupted. The routines can operate in an operating system environment or as stand-alone routines occupying all, or a substantial part, of the system processing. Note that steps can be added to, taken from or modified from the steps in the flowcharts presented in this specification without deviating from the scope of the invention. In general, the flowcharts are only used to indicate one possible sequence of basic operations to achieve a functional aspect of the present invention.

Although the present invention has been discussed with respect to specific embodiments, these embodiments are merely illustrative, and not restrictive, of the invention. The scope of the invention is to be determined solely by the appended claims.

What is claimed is:

1. A method for displaying connection information in a network topology display, the method using a system including a processor coupled to a display screen, the method comprising obtaining connection information about a first node interconnected with a second node;

displaying the first node on the display screen;

displaying the second node on the display screen;

if there is a single connection between the nodes then displaying a first connection endpoint symbol on the display screen adjacent to both the first and second nodes;

if there are multiple connections between the nodes then displaying a second connection endpoint symbol on the display screen adjacent to both the first and second nodes, wherein the second endpoint symbol differs from the first connection endpoint symbol and is configured to indicate existence of the multiple connections at the nodes; and displaying a connector between the endpoint symbols.

2. The method of claim 1, wherein the first connection endpoint symbol comprises line end segments, wherein a first line end segment is adjacent to the first node and a second line end segment is adjacent to the second node.

3. The method of claim 1, wherein the second endpoint symbol includes a two-pronged fork.

4. The method of claim 1, wherein one or more of the connection endpoint symbols includes a numeric indication of the number of connections.

5. The method of claim 4, wherein the step of displaying an indication includes a substep of displaying a text description of the number of connections.

6. The method of claim 1, the computer system further comprising a user input device, the method further comprising accepting a signal from the user input device to indicate that the user has selected he second connection endpoint type displayed on the display screen; and displaying an indication of the number of connections represented by the selected second connection endpoint type.

7. The method of claim 6, wherein the text is displayed in a pop-up box.

8. The method of claim 1, wherein the multiple connections include redundant connections.

9. The method of claim 1, wherein the multiple connections include separate channels.

10. The method of claim 1, wherein the multiple connections include discrete physical connections.

11. An apparatus for displaying connection information, the apparatus comprising a processor coupled to a display screen;

a data source coupled to the processor for providing connection information about a first node interconnected with a second node;

one or more node display processes for displaying the first and second nodes on the display screen;

a processing device for determining a number of connections between the first and second nodes based on the connection information;

one or more connection display processes for displaying a first connection endpoint symbol on the display screen adjacent to both the first and second nodes if there is a single connection between the nodes based on the determined number of connections, and for displaying a second connection endpoint symbol on the display screen adjacent to both the first and second nodes if there are more than one connections between the nodes based on the determined number of connections, wherein the second endpoint symbol comprises a single icon configured to indicate the determined number of connections is at least two.

12. A computer-readable medium including instructions for execution in a system including a processor coupled to a display screen, the instructions comprising obtaining connection information about a first node interconnected with a second node;

displaying the first node on the display screen;

displaying the second node on the display screen;

if there is a single connection between the nodes then performing the step of displaying a first connection endpoint symbol on the display screen adjacent to both the first and second nodes;

if there are multiple connections between the nodes then performing the step of displaying a second connection endpoint symbol on the display screen adjacent to both the first and second nodes, wherein the second connection endpoint symbol differs from the first connection endpoint symbol and is configured to indicate existence of the multiple connections at the nodes.

* * * * *